United States Patent [19]

Eskeli

[11] 3,931,713
[45] Jan. 13, 1976

[54] TURBINE WITH REGENERATION

[76] Inventor: Michael Eskeli, 7994-41 Locke Lee, Houston, Tex. 77042

[22] Filed: Dec. 30, 1974

[21] Appl. No.: 537,067

Related U.S. Application Data

[63] Continuation-in-part of Ser. No. 405,628, Oct. 11, 1973.

[52] U.S. Cl. .................................................. 60/650
[51] Int. Cl.².... F01K 25/02; F02C 1/04; F02G 1/00
[58] Field of Search .............. 60/643, 645, 650, 682

[56] References Cited
UNITED STATES PATENTS

| | | | |
|---|---|---|---|
| 2,490,064 | 12/1949 | Kollsman | 60/682 |
| 2,514,875 | 7/1950 | Kollsman | 60/682 |
| 2,597,249 | 5/1952 | Kollsman | 60/682 |
| 3,236,052 | 2/1966 | Guin | 60/682 |
| 3,530,671 | 9/1970 | Kolodziej | 60/682 |

*Primary Examiner*—Martin P. Schwadron
*Assistant Examiner*—H. Burks, Jr.
*Attorney, Agent, or Firm*—R. W. Dickerson

[57] ABSTRACT

A method and apparatus for generating power by passing a motivating fluid from a higher energy level to a lower energy level by compressing said fluid within a centrifuge type first rotor and discharging said fluid via nozzles near the first rotor periphery forwardly in the direction of rotation to a second rotor which is an inward flow type reaction turbine, then passing said fluid through a regeneration type heat exchanger to transfer heat from the inward bound fluid into outward bound fluid, after which the fluid is cooled in a heat exchanger to its original temperature and is passed outward again thus completing its cycle. Heat is added to said fluid near the periphery of the second rotor, or the heat may be added near the periphery of the first rotor, or both. Additionally, the fluid may be supplied to the unit from outside source, and returned to such outside source, and the cooling thus may be eliminated from the unit. Further, the entering fluid from outside source may be at an elevated pressure. Fluids used may be gaseous, which is normal for a closed type unit, and may be also liquids at entry for the open type unit.

6 Claims, 5 Drawing Figures

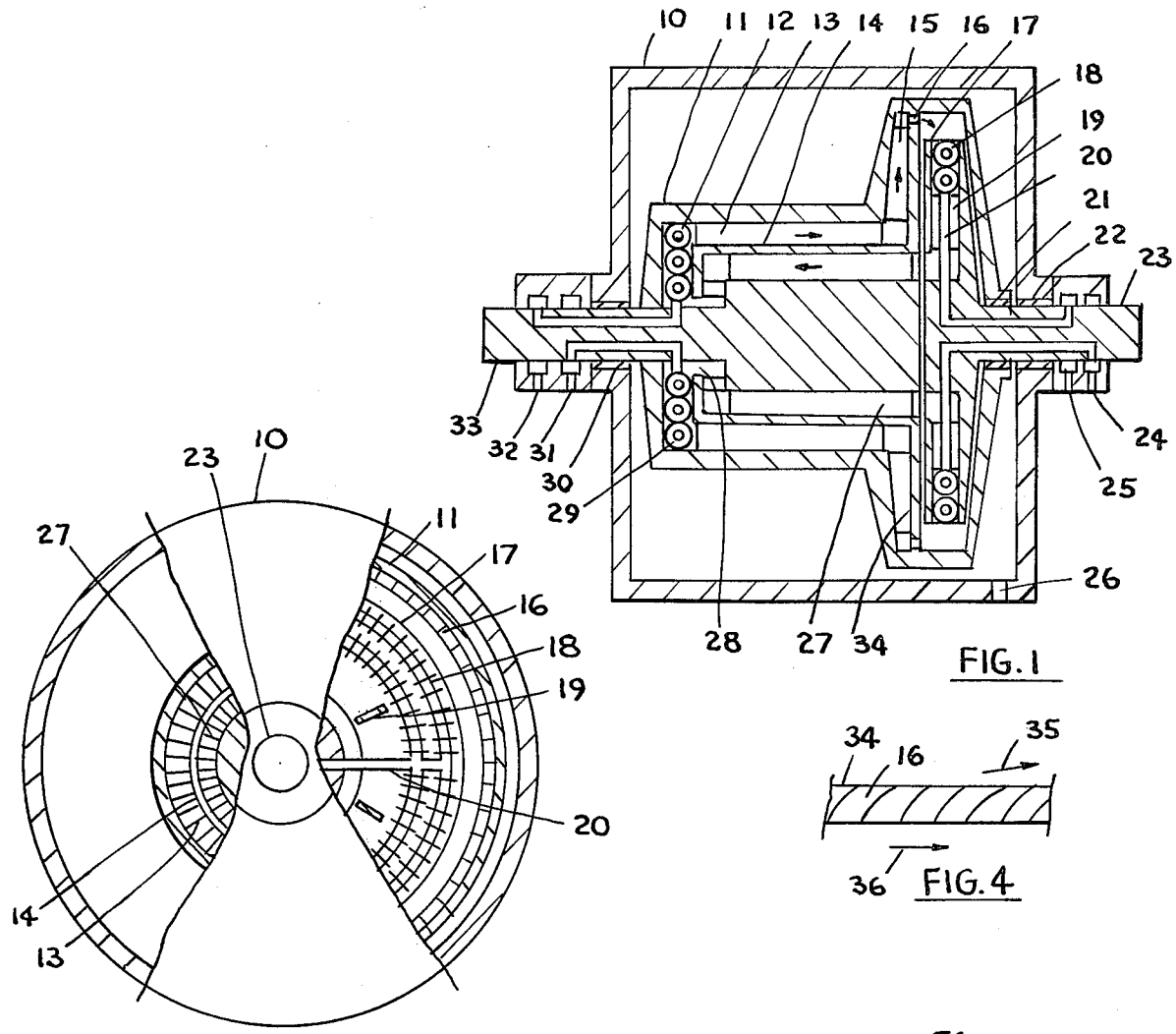
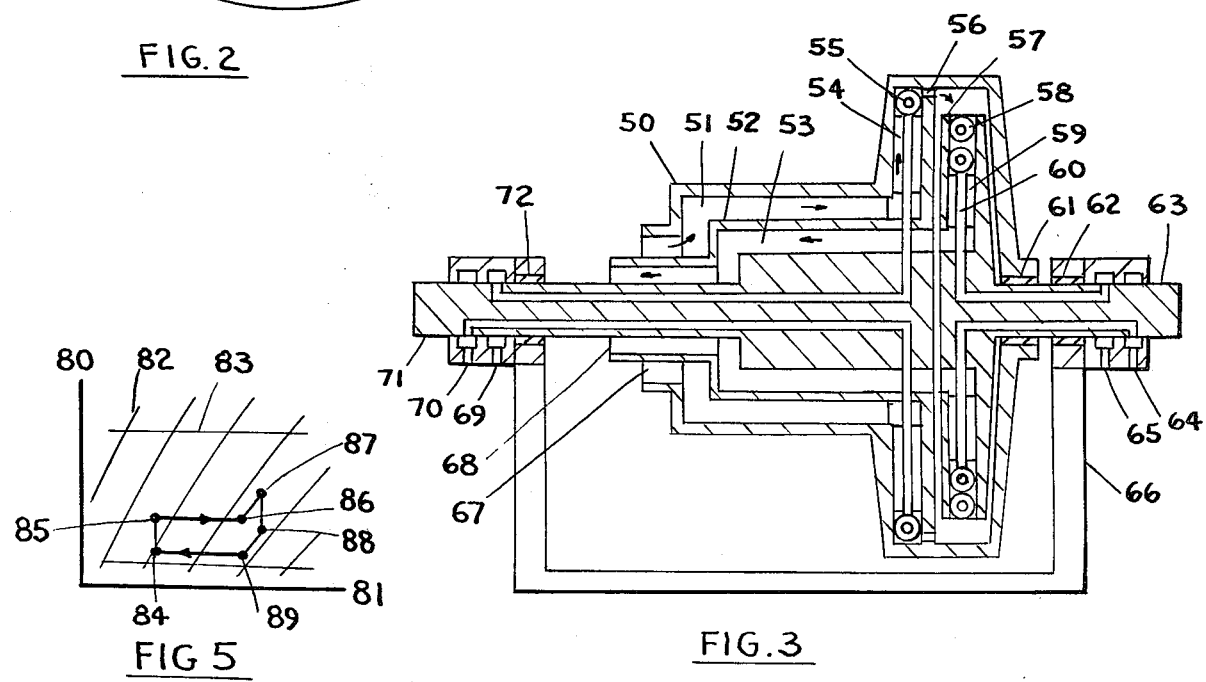

TURBINE WITH REGENERATION

This application is a continuation-in-part application of "Turbine with Dual Rotors," Ser. No. 405,628, filed 10/11/73, and uses material of a previous U.S. Pat. No. 3,834,179, "Turbine with Heating and Cooling".

BACKGROUND OF THE INVENTION

This invention relates generally to devices for generating power in response to a fluid being flowed from a higher energy level to a lower energy level by passing said fluid through a turbine for generating said power.

There have been various types of turbines previously, in some of which a fluid is accelerated in a single or multiple stationary nozzles and then passed to vanes mounted on a rotating rotor wheel, where the kinetic energy contained by said moving fluid is converted to power by decelerating said fluid.

These conventional turbines normally have a high energy loss due to fluid friction, especially between rotor vanes and the fluid where the velocity differential is usually large. Also, these turbines often require complex shaped turbine vanes making the unit costly.

SUMMARY OF THE INVENTION

It is an object of this invention to provide a turbine for power generation in which heat is converted to power, in an efficient and economical manner, and with high thermal efficiency. It is also an object of this invention to provide a means for transferring heat from the motivating or working fluid, which is the first fluid, during its passage from rotor periphery to rotor center into said first fluid which is passing from rotor center towards the rotor periphery. This heat transfer improves the efficiency of the turbine, and also reduces the necessary rotor rotational speed, thus allowing the use of less costly rotor construction.

BRIEF DESCRIPTION OF THE DRAWINGS

FIG. 1 is a cross section of one form of the device, and

FIG. 2 is an end view of the unit shown in FIG. 1.

FIG. 3 is a cross section of another form of the device.

FIG. 4 is a detail of rotor nozzles.

FIG. 5 is a pressure-enthalpy diagram of the first fluid with working cycle illustrated thereon for said first fluid.

DESCRIPTION OF PREFERRED EMBODIMENTS

Referring to FIG. 1, therein is shown a cross section of one form of the turbine. In this form the first fluid is sealed within the rotor with a second fluid which supplies heat to the first fluid, and a third fluid which cools the first fluid, being circulated from external sources. The first fluid is accelerated and compressed within the first rotor, and after discharge from first rotor nozzles into the second rotor, receives heat from said second fluid, and after deceleration and expansion said first fluid passes in heat exchange relationship with the first fluid flowing outward so that heat is transferred from the inward bound first fluid to the outward bound first fluid. Cooling is then provided for the first fluid to bring the first fluid temperature to an initial predetermined value. In FIG. 1, 10 is casing, 11 is first rotor, 12 is third fluid heat exchanger, 13 is vane serving also as heat exchange member, 14 is heat conductive wall, 15 is vane, 16 is nozzle, 17 is second rotor, 18 is second fluid heat exchanger, 19 is vane, 20 is second fluid conduit, 21 is bearing and seal, 22 is bearing and seal, 23 is second rotor shaft for delivery of power, and for support of second rotor, 24 and 25 are supply and return for third fluid, 26 is vent opening in casing into which a vacuum source may be connected, 34 is dividing wall, 27 are vanes serving also as heat exchange members, 28 is first fluid passage, 30 is bearing and seal, 31 and 32 are second fluid entry and exit, and 33 is first rotor shaft.

In FIG. 2, an end view of the unit of FIG. 1 is illustrated. 10 is casing, 11 is first rotor, 17 is second rotor, 16 are first fluid nozzles, 18 is heat exchanger, 19 are vanes, 20 is conduit, 13, 14 and 27 form a heat exchanger for first fluid and 23 is second rotor shaft.

In FIG. 3, another form of the turbine is shown, where the first fluid is supplied to the turbine from outside sources thus eliminating the third fluid heat exchanger. 50 is first rotor, 51, 52 and 53 form a heat exchanger for the first fluid, 55 and 58 are heating heat exchangers for adding heat to the first fluid and may use a second fluid at the same temperature or at a different temperature as the heating fluid, 54 are vanes within first rotor, 56 are first fluid nozzles oriented to discharge forwardly, 57 is second rotor, 59 are vanes, 60 is second fluid conduit, 61, 62 and 72 are bearings, 64, 65, 69 and 70 are entries and exits for the second fluid, 63 is second rotor shaft, 71 is first rotor shaft, 66 is base, and 67 and 68 are exit and entry for the first fluid.

In FIG. 4, a detail of the first fluid nozzles is shown. 34 is wall onto which nozzles 16 are mounted. 35 is approximate direction of leaving first fluid, and 36 indicates direction of rotation of first rotor.

In FIG. 5, a pressure-enthalpy diagram for the first fluid is shown, with the working cycle for the first fluid illustrated thereon. 80 is pressure line and 81 is enthalpy line, 82 are constant entropy line, 83 are constant pressure lines, and for the cycle, compression with heat removal, or without heat removal, occurs from 84 to 85, heat is added from returning first fluid from 85 to 86, further compression is from 86 to 87, then expansion from 87 to 88 and 89, and heat removal to first fluid from 89 to 84, thus completing the cycle. Heat is normally added between 87 and 88, from second fluid. The heat addition between 85 and 86, and heat removal between 89 and 84 may be at constant or vary in pressure as desired; pressure may be varied conveniently by increasing or decreasing the diameter of the first fluid-to-first fluid heat exchanger, making said heat exchanger tapered.

In operation, the rotors are filled to a desired pressure with a suitable first fluid, and the first rotor is caused to rotate. First fluid is first compressed with heat removal, and then is passed in heat exchange relationship with the inward bound first fluid with addition of heat, and after this the first fluid is further compressed and accelerated and after this compression, the first fluid is passed via nozzles mounted on the first rotor forwardly in the direction of rotation, after which the first fluid enters a second rotor inward extending passages for deceleration, with heat being added to the first fluid in the second rotor inward extending passages for reduction of density of said first fluid. After passing inward and decelerating, said first fluid is passed in heat exchange relationship with the outward bound first fluid, and after that, the first fluid may be further decelerated, and then said first fluid enters said outward extending passages of the first rotor thus completing the cycle.

The operation of the open turbine of FIG. 3 is similar to that described, except that the first fluid is supplied from external sources, and is then returned to said external source, with cooling then being deleted.

The work input to the first rotor is the work required to accelerate the first fluid, and the work output by the second rotor is the work of deceleration received by the said second rotor. The work output by the turbine is the work differential of these two rotors.

The rotational speed of the second rotor may be higher than the rotational speed of the first rotor. To provide for inward flow of the first fluid within the second rotor, the fluid density is reduced by adding heat to the first fluid either within said second rotor, or also within the first rotor.

The addition of heat from the inward bound first fluid to the outward bound first fluid increases the temperature of the first fluid during latter part of compression and during expansion, and thus has the effect of improving the thermal efficiency of the turbine. Further, another effect is the reduction in the needed rotational speed for the turbine rotors, thus reducing the required strength for the rotors, and making said rotors more economical to make and operate.

Working fluids for this turbine are usually gases for the said first fluid, and liquids for the said second and third fluids. Gaseous second and third fluids may be also used, and the first fluid may be a liquid in some instances. Also, the first fluid may undergo a phase change within the turbine, if so desired, when using a suitable fluid.

Applications for this turbine include normal power generation service using various heat sources.

The first rotor shaft and the second rotor shaft are normally connected via a power transmission device so that a part of the power produced by the second rotor is used to rotate the first rotor. Starting of the unit is by a starting device.

The vanes of the rotors may be made curved if desired. In many instances, the first rotor vanes may be curved backward to increase compression of the first fluid, and the vanes of the second rotor may be also curved, to improve performance, and to suit the design and fluid selected. In this connection, the fins for the heat exchangers are considered to be vanes.

The pressure-enthalpy diagram shown in FIG. 5, is approximate only. This diagram may be varied, depending of the amount of heat added in the second rotor, or in the first rotor, and depending on the specific location of the second fluid and third fluid heat exchangers. In particular, heat may be added to the first fluid during expansion to make the first fluid actually increase in temperature; this will normally improve the overall thermal efficiency of the turbine. Also, heat removal by said third fluid may be conducted in places other than that shown in FIG. 1, as desired.

It should be also noted that the heat addition to said first fluid may be from other sources than said second fluid, and similarly, some other means may be used to cool said first fluid than said third fluid. Such heating sources may include electricity, or other rotors mounted in proximity to this turbine; these will not change the spirit of this invention.

The heat exchanger means for transferring heat from the inward bound first fluid to the outward bound first fluid can also be located within the second rotor, and also the entry and exit for the first fluid into the turbine may be within said second rotor. Such arrangements are not shown specifically in the drawings since they are considered to be within the capabilities of a skilled designer, in view of the descriptions given herein.

What I claim is:

1. A turbine for generating power and comprising:
 a. means for rotatably supporting first and second rotors;
 b. First and second rotor shafts journalled in said support means for rotation;
 c. first rotor means provided said first shaft for rotation therewith, said first rotor means having a first passageway for an outward bound first fluid, with said first passageway communicating at its downstream end with means for accelerating said first fluid forwardly in the direction of rotation of said first rotor means and for passing said first fluid into said second rotor means, said first rotor means further having a second passageway for inbound first fluid in close proximity to said first passageway and in communication therewith near the downstream end of said second passageway, and heat exchanger means intermediate said first and second passageways for adding heat to said outward bound first fluid from said inward bound first fluid;
 d. second rotor means mounted on said second shaft for rotation therewith, said second rotor having further passageway means for said first fluid, said further passageway means being in fluid communication at its upstream end with said first rotor accelerating means, and in fluid communication at its downstream end with said first rotor second passageway.

2. The turbine of claim 1 wherein a heating heat exchanger is provided for adding heat to said first fluid downstream of said first passageway.

3. The turbine of claim 1 and including heat removal heat exchanger means provided downstream of said first rotor second passageway means.

4. A method of generating power comprising the following steps:
 a. compressing a outward bound motivating fluid within a first passageway of a rotating first rotor;
 b. accelerating and discharging said motivating fluid into a passageway of an independently rotating second rotor;
 c. passing said motivating fluid from said second rotor passageway into a second passageway of said first rotor; and
 d. effecting heat transfer from said motivating fluid in said first rotor second passageway to said motivating fluid in said first rotor first passageway.

5. The method of claim 4 and including the following additional step:
 returning said motivating fluid from the downstream end of said first rotor second passageway to the upstream end of said first rotor first passageway.

6. A method of transferring heat within a rotor, comprising the following steps:
 a. driving an outward bound motivating fluid within a first passageway of said rotor;
 b. effecting a heat transfer between an outside source and said motivating fluid;
 c. causing said motivating fluid to be inbound within a second passageway of said rotor, proximate to said first passageway; and d. effecting heat transfer between said motivating fluid in said second passageway and said motivating fluid in said first passageway.

* * * * *